United States Patent
van Reenen

(10) Patent No.: US 9,271,481 B2
(45) Date of Patent: Mar. 1, 2016

(54) 3 DIMENSIONAL MOVING AND VISIBLE GILL FOR FISHING LURES

(76) Inventor: Paul Marcus van Reenen, Sebastian, FL (US)

( * ) Notice: Subject to any disclaimer, the term of this patent is extended or adjusted under 35 U.S.C. 154(b) by 395 days.

(21) Appl. No.: 13/603,382

(22) Filed: Sep. 4, 2012

(65) Prior Publication Data

US 2013/0067793 A1    Mar. 21, 2013

Related U.S. Application Data

(60) Provisional application No. 61/575,961, filed on Sep. 1, 2011.

(51) Int. Cl.
*A01K 85/00*  (2006.01)
*A01K 85/08*  (2006.01)
*A01K 85/16*  (2006.01)

(52) U.S. Cl.
CPC .................. *A01K 85/16* (2013.01); *A01K 85/00* (2013.01); *A01K 85/08* (2013.01)

(58) Field of Classification Search
CPC ........ A01K 85/00; A01K 85/01; A01K 85/08
USPC ............ 43/42.32, 42.24, 42.26, 42.28, 42.06, 43/42.25
See application file for complete search history.

(56) References Cited

U.S. PATENT DOCUMENTS

| | | | | |
|---|---|---|---|---|
| 567,310 A * | 9/1896 | Gaide | .................... | A01K 85/00 43/42.28 |
| 865,683 A * | 9/1907 | Credlebaugh | ................ | 43/42.26 |
| 1,611,635 A * | 12/1926 | Dills | ............................ | 43/42.26 |
| 1,786,568 A * | 12/1930 | Kutz | ............................ | 43/42.34 |
| 1,994,692 A * | 3/1935 | Davenport | .................... | 43/42.28 |
| 2,018,622 A * | 10/1935 | Davenport | ............. | A01K 85/08 156/172 |
| 2,039,039 A * | 4/1936 | Steen | ........................... | 43/42.28 |
| 2,165,734 A * | 7/1939 | Stracener | ............... | A01K 85/08 43/42.27 |
| 2,224,389 A * | 12/1940 | Haselwood | .................. | 43/42.28 |
| 2,278,876 A * | 4/1942 | Hart | ....................... | A01K 85/08 43/42.09 |
| 2,317,781 A * | 4/1943 | Lehto | ........................... | 43/42.28 |
| 2,571,980 A * | 10/1951 | Weigandt | ..................... | 43/42.26 |
| 2,597,792 A * | 5/1952 | Hardy | .......................... | 43/42.28 |
| 2,619,762 A * | 12/1952 | Summitt, Sr. | ................ | 43/42.26 |
| 2,623,318 A * | 12/1952 | Weigandt | ..................... | 43/42.27 |
| 2,661,564 A * | 12/1953 | Weigandt | ..................... | 43/42.26 |
| 2,793,461 A * | 5/1957 | Korte | ..................... | A01K 85/00 43/42.28 |
| 3,191,336 A * | 6/1965 | Cordell, Jr. | ................... | 43/42.28 |
| 3,205,609 A * | 9/1965 | Knapton | ...................... | 43/42.26 |
| 3,360,882 A * | 1/1968 | Belokin, Jr. | .................. | 43/42.33 |
| 3,495,350 A * | 2/1970 | Lievense | ................ | A01K 85/08 43/42.25 |
| 3,500,574 A * | 3/1970 | Putnam | .................. | A01K 85/08 43/42.25 |

(Continued)

*Primary Examiner* — Darren W Ark
(74) *Attorney, Agent, or Firm* — William C. Yarbrough, III

(57) ABSTRACT

A 3-dimentional moving and visible filamentous material for insertion into a rebate or slot in the gill area of a baitfish lure which is designed to protrude out and away from the lure and intentionally simulates fibrous gill filaments and the exsanguination of an injured, bleeding prey fish. This filamentous insertion is created from a crimson natural, synthetic, or combination material that is metallic or translucent and naturally reflective in nature. The rebate or slot is a dissimilar wall height recess incorporated into the design of the lure which is located between the head and body of the lure where the circumference of the head portion is slightly larger than circumference of the body portion in the area of a "gill slit" causing a vortex of turbulent water flow impacting and agitating the filamentous insertion fibers. The method of attachment is in the form of a water-resistant, transparent glue.

11 Claims, 4 Drawing Sheets

(56) References Cited

U.S. PATENT DOCUMENTS

| | | | | |
|---|---|---|---|---|
| 3,750,323 A * | 8/1973 | Weis | | 43/42.28 |
| 3,768,195 A * | 10/1973 | Proietti | | 43/42.33 |
| 3,867,781 A * | 2/1975 | Wolfe | | 43/42.09 |
| 3,979,853 A * | 9/1976 | Storm et al. | | 43/42.29 |
| 4,149,334 A * | 4/1979 | Rogers | | 43/42.25 |
| 4,337,591 A * | 7/1982 | Gell et al. | | 43/42.09 |
| 4,602,453 A * | 7/1986 | Polley | | 43/42.06 |
| 4,831,764 A * | 5/1989 | Jecevicus | | 43/42.26 |
| 4,864,766 A * | 9/1989 | Bohn | | 43/42.37 |
| 5,113,615 A * | 5/1992 | Drachkovitch | A01K 85/10 | 43/42.19 |
| 5,245,783 A * | 9/1993 | Cumiskey | | 43/42.37 |
| 5,276,992 A * | 1/1994 | Kato | | 43/42.06 |
| 5,446,991 A * | 9/1995 | Brackus | A01K 85/08 | 43/42.25 |
| 5,491,927 A * | 2/1996 | Ortiz | | 43/42.28 |
| 5,661,921 A * | 9/1997 | Mason | | 43/42.06 |
| 5,787,634 A * | 8/1998 | Way | | 43/42.26 |
| 5,815,978 A * | 10/1998 | Huddleston | | 43/42.09 |
| 6,185,857 B1 * | 2/2001 | Hnizdor | A01K 85/00 | 43/42.11 |
| 6,212,818 B1 * | 4/2001 | Huddleston | | 43/42.26 |
| 6,393,755 B1 * | 5/2002 | Weaver | | 43/42.06 |
| 6,393,758 B1 * | 5/2002 | Sparkman | A01K 85/08 | 43/42.25 |
| 6,408,565 B1 * | 6/2002 | Duncan | | 43/42.06 |
| 6,647,660 B1 * | 11/2003 | Kruger | | 43/42.53 |
| 7,114,285 B1 * | 10/2006 | Ince | | 43/42.26 |
| 7,234,267 B1 * | 6/2007 | Konstant | A01K 85/01 | 43/42.24 |
| 7,694,453 B1 * | 4/2010 | Arrico | | 43/42.32 |
| 8,091,271 B2 * | 1/2012 | Mayer | | 43/42.26 |
| 8,458,950 B2 * | 6/2013 | Mayer | | 43/42.26 |
| 8,789,308 B2 * | 7/2014 | Hughes | | 43/42.32 |
| 8,793,924 B2 * | 8/2014 | Hughes | | 43/42.26 |
| 9,066,505 B1 | 6/2015 | Vedder | | |
| 2004/0111951 A1 * | 6/2004 | Reed | | 43/42.32 |
| 2005/0034354 A1 * | 2/2005 | Lunt | A01K 85/08 | 43/42.53 |
| 2008/0104876 A1 * | 5/2008 | Ito | | 43/42.06 |
| 2008/0148623 A1 * | 6/2008 | Uhrig | A01K 85/02 | 43/42.39 |
| 2008/0271358 A1 * | 11/2008 | Meroney | | 43/42.26 |
| 2009/0126256 A1 * | 5/2009 | Gregory | | 43/42.09 |
| 2009/0172993 A1 * | 7/2009 | Willis et al. | | 43/42.28 |
| 2009/0300964 A1 * | 12/2009 | Nemethy | | 43/42.53 |
| 2010/0011651 A1 * | 1/2010 | Rapelje | | 43/42.24 |
| 2010/0146837 A1 * | 6/2010 | Zernov | | 43/42.24 |
| 2013/0025179 A1 * | 1/2013 | Tsutsumi | | 43/17.5 |
| 2013/0269235 A1 * | 10/2013 | Mancini et al. | | 43/42.09 |
| 2013/0333272 A1 * | 12/2013 | Gravelle et al. | | 43/42.32 |
| 2014/0190064 A1 * | 7/2014 | Fellbaum | | 43/42.09 |
| 2014/0345185 A1 * | 11/2014 | Marlin | A01K 85/00 | 43/42.24 |
| 2014/0360088 A1 * | 12/2014 | Hamaguchi | A01K 85/16 | 43/42.32 |

\* cited by examiner

3 DIMENSIONAL MOVING AND VISIBLE GILL FOR FISHING LURES

CROSS-REFERENCE TO RELATED APPLICATIONS

U.S. Provisional Application No. 61/575,961 filed on Sep. 11, 2011

NAMES OF THE PARTIES TO A JOINT RESEARCH AGREEMENT

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

1. Field of the Invention

The present invention relates to a fishing lure gill attachment and more particularly, to an improved "bleeding gill" lure addition which is adhered to and within the "gill slit" of a lure, extending out and away from the gill slit, and is designed and made to portray a realistic, life-like representation of a fleeing or injured and bleeding bait fish.

2. Description of the Related Art

In addition to the use of live bait, the fishing industry has long observed the need for various forms of artificial bait—not least among these is the artificial lure. These lures are available in a multitude of sizes, shapes, and colors. The material used to manufacture lures equally ranges widely from wood, plastic, rubber, or metal. Yet, with all of the countless permutations available, each lure has but one singular objective—enhancing the life-like appearance of inanimate bait, attracting predator fish, and thus increasing the odds of the angler catching a fish.

The basic design of a baitfish lure is an artificial construction that is made to resemble a fish that is prey to certain predator fish. In its most fundamental design, the baitfish lure is a fish-like assemblage that is designed to mimic the actions, movements, and appearance of a prey fish in order to entice a predator fish to strike. To this end, manufacturers offer a wide array of configurations and materials used to build a durable, baitfish lure with life-like emulations of the natural maneuvering of a live baitfish. Yet, arguably the single most important augmentation to the lure is that of increased prey fish recognition through enhanced bait fish appearance. Conceivably the most enticing feature of a prey fish is that of the color crimson in the area of the gill slit of a prey fish.

As is well accepted, predatory fish will key in on the red gill section of a baitfish or minnow. When being chased, most baitfish exhibit a flared appearance to their gill covers. This is primarily due to the fish's urgent need for gaseous exchange from the surrounding water in response to increased energy demands as a result of being chased. Further, a prey fish displays an amplified amount of crimson color upon injury in the form of free-flowing blood. The natural tendency of predators to recognize this increased area of crimson by a fleeing or bleeding quarry is correspondingly intensified making pursuit more likely. To simulate this, lure manufacturers customarily apply red or orange color to the accepted gill area of a lure as an inducement to procure a bite or strike from a predator fish. Yet, this red or orange painted area is mono-dimensional and flat and can only be observed from the side of the lure when the predator is immediately adjacent or perpendicular to the lure.

So, while baitfish lures have historically exhibited any number of colors, reflective materials, insignias, and attachments to give the appearance of a life-like prey fish, lure manufacturers are yet constantly striving to improve the visual recognition of fishing lures in an attempt to further tempt predator fish. The incorporation of elements of faux exsanguination from the fish gill to give the guise of a fleeing or wounded and bleeding prey fish is a common addition. Bait fish lures in this category are routinely sprayed or painted with a red or crimson color to give the look of a "bleeding gill". Plainly, though, they are mono-dimensional, flat-angle views made with no added motion made available to a predator fish. Moreover, the predator fish would need to approach the mono-dimensional demarcation at essentially an immediately adjacent or perpendicular approach to appreciate the representation of injury through the display of artificially adhered blood.

Conversely, the 3-dimensional "bleeding gill" filament of the present invention exhibits superior recognition by the predator fish from a multitude of angles including front, rear, side, top and ventral views. What's more, the distance at which the predator fish can be made to appreciate the filamentous extrusion, as simulated filaments or leaching blood, is naturally lengthened given to the fact that the additional gill accessory occupies a space that extends beyond the body of the baitfish lure as would the natural flow of blood out and away from the gill of a wounded fish. Lastly, this invention is superior to mono-dimensional endeavors of the past in that the lability of the individual fibers under hydraulic pressure, exerted by moving water, affords a realistic representation of the filament and blood movements that a mono-dimensional adhesive paint could not hope to provide.

So, as can be seen from the above examples, no one representation of a "bleeding gill" matches the novel and inventive configuration of the present invention. Therefore, despite numerous endeavors to design a lure that gives the appearance of a wounded, bleeding prey fish, these attempts have fallen short of the their goal and do not lend themselves to a natural appearing mobile "bleeding" gill filament.

It is this need for a realistic-looking, "bleeding" gill that the present invention seeks to address.

BRIEF SUMMARY OF THE INVENTION

The present invention relates to a red-shade reflective filamentous material that is either a synthetic, natural, or metallic filament that is made to simulate a set of 3-dimensional, moving gill filaments of an actual bait fish. The filamentous material itself is a loosely-aggregated "tinsel-like" material that harbors a thickness of approximately 250 microns (¼ mm) that is designed to adhere within a rebate or slot to the rear of the bait fish lures head in the area between the lures head and body on the ventral side of the lure. The rebate or slot is a crevice created in the form of a silt or "U-shape" in the area posterior to the eye and anterior to the lure body which mimics the natural anatomical location of the a bait fish's gills. The crevice can be of such a depth and length as to most closely resemble the natural configuration of the particular baitfish which is being simulated. The filamentous material is adhered to the indented portion of the crevice via a clear water-resistant, transparent adhesive.

DETAILED DESCRIPTION OF THE PREFERRED EMBODIMENTS

Figure 1:
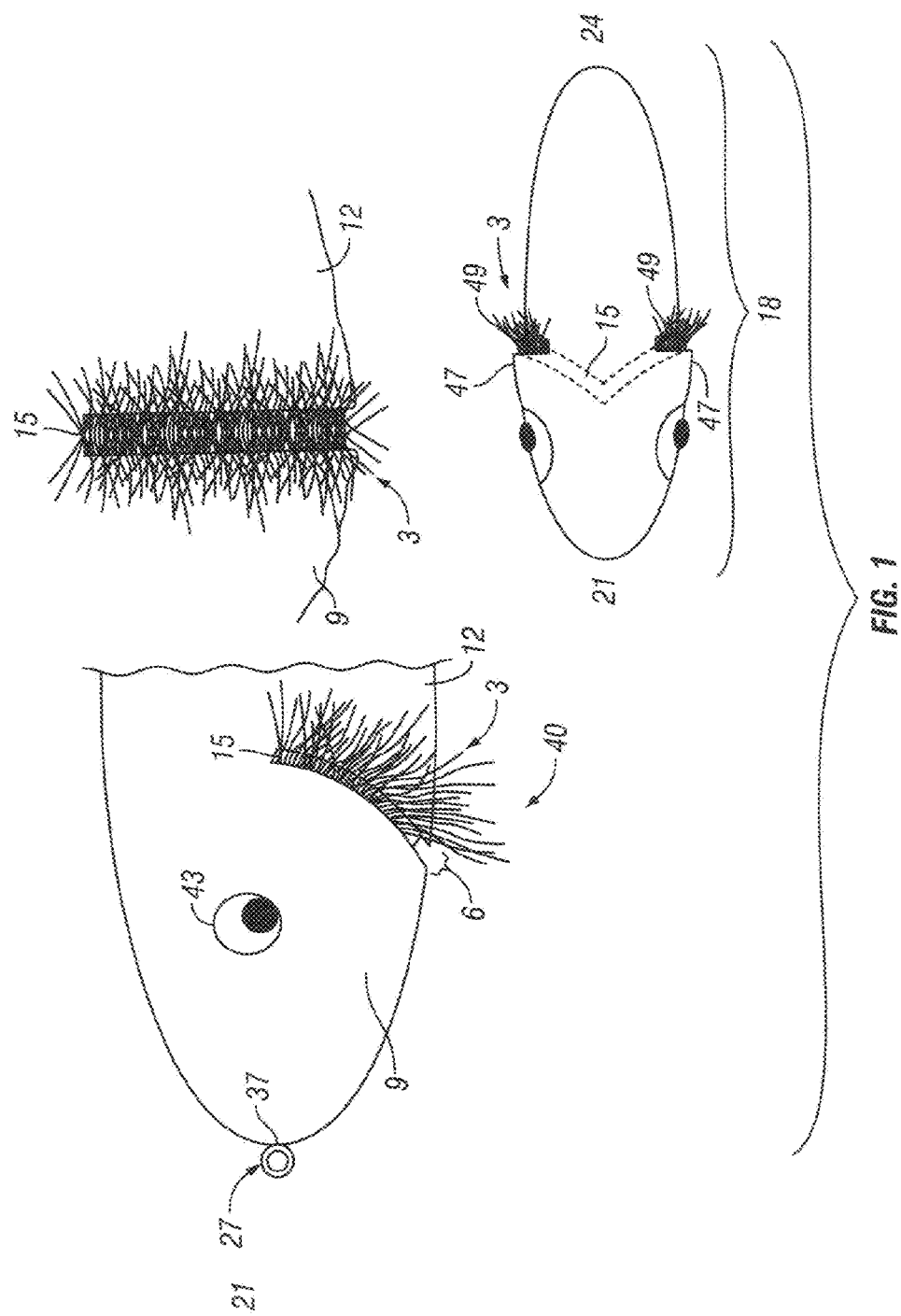
FIG. 1 is a side view and enhanced side view with greater detail of the present invention together with a top view of the present invention.

The following detailed description is of the best currently contemplated modes of carrying out exemplary embodiments of the present invention. The description is not to be taken in a limiting sense, but rather is made merely for the purpose of illustrating the general principles of the invention, since the scope of the invention is best defined by the appended claims and diagrams.

Broadly, one embodiment of the present invention provides a crimson, filamentous fiber 3 insert with a thickness of 250 microns (¼ mm) to and within a "U-shaped" rebate or slot 15 with a depth of 1000 microns (1.0 mm) and a width of 1000 microns (1.0 mm) of a bait fish lure which is engineered and designed to mimic the appearance of natural gill filaments of a fleeing fish and flow of blood from an injured, bleeding bait fish thereby attracting predator fish. As depicted in FIGS. 1 through 4, a filamentous, freely-movable synthetic or natural material 3 that is contoured and manipulated to adhere to and within an area roughly equivalent to a natural bait fish's gill slit 6 which separates the lure's head 9 from the lure's body 12. Moreover, the filamentous material 3, while harbored within the recesses of a simulated gill slit 6, is not bifurcated, but creates a continuous and uninterrupted strand traversing the entire span of the "U-shaped" 16 rebate or slot 15.

Figure 2:
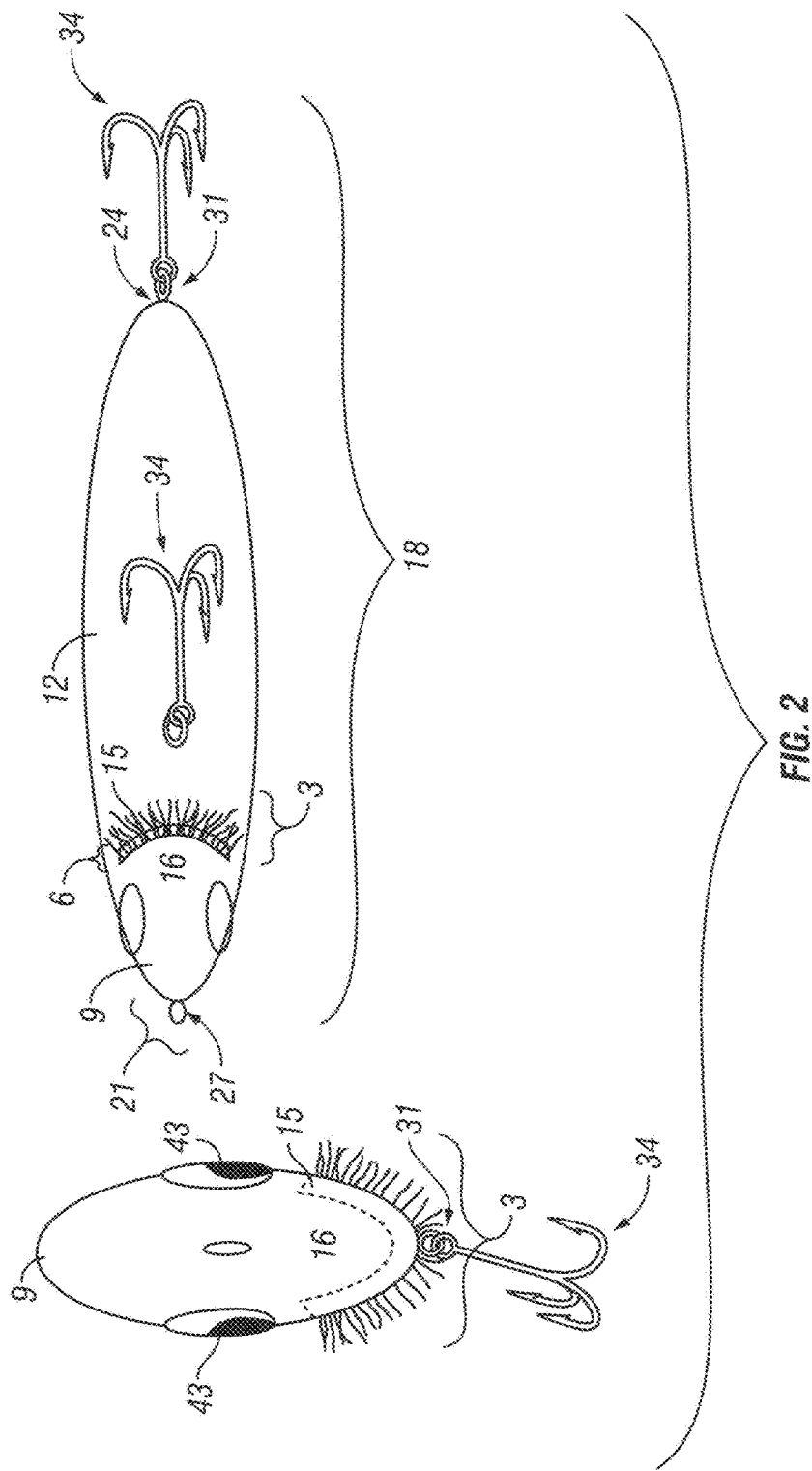
FIG. 2 illustrates the front and bottom views of the Bleeding Gill of FIG. 1.
Figure 3:
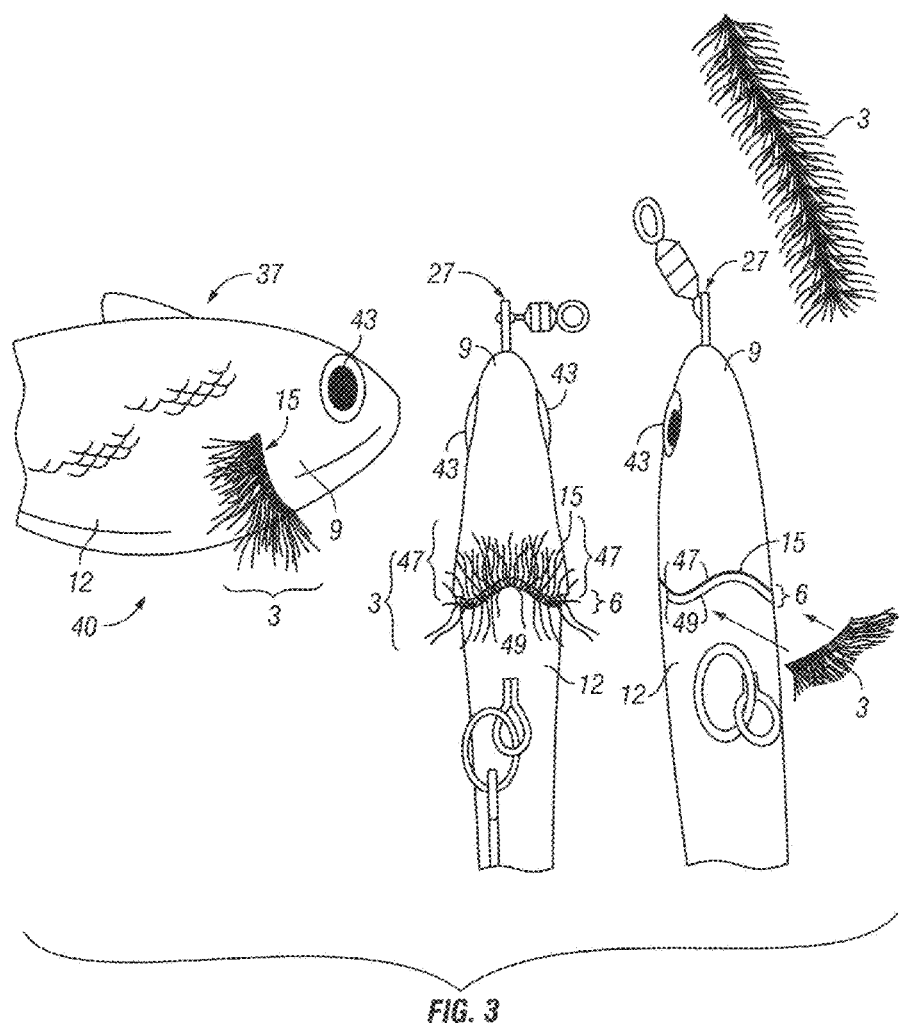
FIG. 3 is a side view, bottom view, and perspective, unassembled view of the present invention together with a magnified filament view of the present invention.
Figure 4:
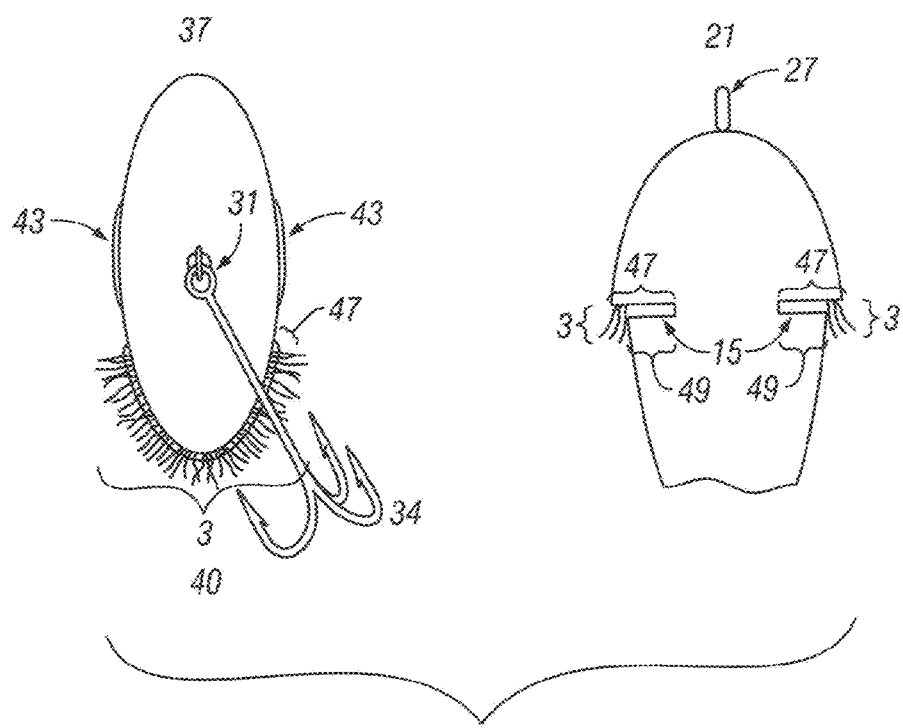
FIG. 4 is a rear view featuring the heighted anterior wall and filamentous material of FIG. 1 together with an exaggerated cross-sectional view of the dissimilar wall heights bordering the rebate or slot of FIG. 1.

FIG. 1-FIG. 3 illustrate one embodiment of the 3-dimensional Moving and Visible, Bleeding Gill Attachment to a fishing lure. One embodiment of the 3-dimensional Moving and Visible, Bleeding Gill may be produced from corrosion resistant, natural or synthetic, reflective filamentous fibers 3, or a combination thereof, that further incorporates a metallic or metallic-like material that may be made in any one or various shades of crimson. The fibers 3 of this bleeding gill may also be accented to simulate the fish gill itself to further aid in the appearance of a life-like fish gill with various colors—both natural and fluorescent. The lure 18 to which the fibers are attached may be made of wood, metal, or synthetic material. The naturally appearing fish lure 18 will generally consist of a fore 21 and an aft 24 section, with the fore 21 section harboring a point of attachment 27 for a fishing line and the aft portion 24 harboring a point of attachment 31 for a hook or plurality of hooks 34. This lure will have a top 37 and a bottom 40 portion to remain in an attractive state while being retrieved with the bottom section being designed to accommodate a hook 34 or plurality of hooks 34. Additionally, the lure may have eyes 43 further advancing the concept of a realistic appearing bait fish or minnow as to augment the life-like appearance of the lure. As well, the lure may be reflective or painted (not shown) to accommodate the user and for the purpose of accentuation and customization of the lure to a locale or particular area. Other embodiments may be assembled which are cosmetically appealing.

Lastly, the process of manufacture of a bait fish lure should include a rebate or slot 15 that is integrated into the lure's design where this rebate or slot 15 demonstrates dissimilar wall heights manifested in an anterior wall 47 of greater height than the posterior wall 49 in the area of the "gill slit" 6. This purposed flare creates a vortex (not shown) due to changes of water pressure from an area of high pressure about the head to an area of low pressure about the body to facilitate filament fiber agitation. The rebate 15 can be incorporated into a mold where the space is continuous and traverses an entire U-shaped 16 span. Equally, this indention may consist of a section where there is an absence of a rebate 15 or slot directly under the head of the lure in the form of a bifurcation. Typically, there will not be filamentous fibers 3 circumventing the head of the baitfish, but this arrangement is not excluded.

On a larger physical scale, the 3-demensional filamentous fibers of the present invention may be of an increased length and width to accommodate the realistic, life-like appearance of larger predator fish lures and big game fish lures.

In another embodiment, the filamentous fibers may be lengthened to control the amount of movement desired by the angler.

In yet another application the "Bleeding Gill" system may be of a continuous non-filamentous, solid nature with a skirt-like appearance.

In yet another embodiment, the Bleeding Gill filamentous insertion may be housed by rebate or slot that is straight-lined, curved, irregular, broken, uneven, or of an accepted area or space that will receive the selected 3-D material selected.

The rebate or slot may be square, U-shape, V-shape, non-symmetrical, convex, concave, zig-zag, continuous or non-continuous.

The location of the rebate or slot is not relegated to the area just posterior to the head section and may be located on other areas of the fish to simulate injury or exsanguination.

The location of the rebate or slot may be on one side of the lure, with no corresponding rebate or slot on the other side of the lure, as to signify a more realistic, asymmetrical point of injury.

It should be understood, of course, that the foregoing relates to exemplary embodiments of the invention and that modifications may be made without departing from the spirit and scope of the invention as set forth in the following claims.

The invention claimed is:

1. A bait fish lure comprising:
   a lure body comprising a lure head, a lure tail, a first lateral side, a second lateral side opposing the first lateral side, a top, and a bottom;
   a slot designed to mimic a fish gill slit that takes the form of an incision along a transverse axis of the bait fish lure between the lure head and the lure tail creating a "U" shape just anterior to the lure head, the slot having a first end on the first lateral side at a first location between the top and bottom of the lure body and a second end on the second lateral side at a second location between the top and bottom of the lure body, the slot extending from the first end, around the bottom, and terminating at the second end, the slot defined by an anterior wall between the slot and the lure head and a posterior wall which is between the slot and the lure tail, the anterior and posterior walls extending along a length of the slot, wherein the anterior wall has a greater height than a height of the posterior wall such that it protrudes farther from the lure body than the posterior wall;

a 3-dimensional moving and visible filamentous material designed to adhere to and within the slot, the filamentous material positioned within the slot and extending therefrom;

a water-resistant, and transparent glue to provide a means of attachment of the filamentous material to and within the slot; and wherein the difference in height between the anterior and posterior walls simulate the gill slit which causes a vortex of turbulent water flow impacting and agitating the filamentous material when the lure is drawn through water.

2. The fishing lure of claim 1, wherein the filamentous material comprises filamentous fibers having a thickness of 250 microns (¼ mm).

3. The fishing lure of claim 1, wherein the filamentous material comprises filamentous fibers that are natural, synthetic, metallic, or a combination thereof.

4. The fishing lure of claim 1, wherein the filamentous material comprises filamentous fibers that are a shade of red, orange, fluorescent, or chartreuse.

5. The fishing lure of claim 1, wherein the filamentous material is of a size and length commensurate with a size of the fishing lure.

6. The fishing lure of claim 1, wherein the filamentous material comprises filamentous fibers having a length and width that may be modified to simulate lesser or greater perceived "blood flow".

7. The fishing lure of claim 1, wherein the slot has a depth of 1000 microns (1.0 mm) and a width of 1000 microns (1.0 mm).

8. The fishing lure of claim 1, wherein the slot has a depth and length commensurate with a size of the fishing lure.

9. A bait fish lure comprising:

a lure body comprising a lure head, a lure tail, a first lateral side, a second lateral side opposing the first lateral side, a top, and a bottom;

a slot in the area of a natural fish gill slit which is designed to mimic a fish gill slit that takes the form of an incision along a transverse axis of the bait fish lure between the lure head and the lure tail creating a "U" shape just anterior to the lure head, the slot having a first end on the first lateral side at a first location between the top and bottom of the lure body and a second end on the second lateral side at a second location between the top and bottom of the lure body, the slot extending from the first end, around the bottom, and terminating at the second end, the slot defined by an anterior wall between the slot and the lure head and a posterior wall which is between the slot and the lure tail, the anterior and posterior walls extending along a length of the slot, wherein the anterior wall has a greater height than a height of the posterior wall such that it protrudes farther from the lure body than the posterior wall;

a 3-dimensional moving and visible filamentous "skirt" designed to adhere to and within the slot, the filamentous skirt positioned within the slot and extending therefrom of such size and length commensuarte with a size of the fishing lure;

a water-resistant, and transparent glue to provide a means of attachment of the filamentous skirt to and within the slot; and wherein the difference in height between the anterior and posterior walls simulate the gill slit which causes a vortex of turbulent water flow impacting and agitating the filamentous skirt when the lure is drawn through water.

10. The bait fish lure of claim 9, wherein the filamentous "skirt" is a shade of red, orange, fluorescent orange, or chartreuse.

11. The bait fish lure of claim 9, wherein the filamentous "skirt" is natural, synthetic, metallic or a combination thereof.

* * * * *